June 30, 1970   G. D. GINTHER   3,517,856
APPARATUS FOR FEEDING ARTICLES ONE AT A TIME INTO A TUBE
Filed July 11, 1968   6 Sheets-Sheet 1

INVENTOR.
GARY D. GINTHER
BY
Barnes, Kisselle, Raisch & Choate
ATTORNEYS

INVENTOR.
GARY D. GINTHER
BY
Barnes, Kisselle, Raisch & Choate
ATTORNEYS

June 30, 1970  G. D. GINTHER  3,517,856
APPARATUS FOR FEEDING ARTICLES ONE AT A TIME INTO A TUBE
Filed July 11, 1968  6 Sheets-Sheet 3

INVENTOR.
GARY D. GINTHER
BY
Barnes, Kisselle, Raisch & Choate
ATTORNEYS

INVENTOR.
GARY D. GINTHER
BY
Barnes, Kisselle, Raisch & Choate
ATTORNEYS

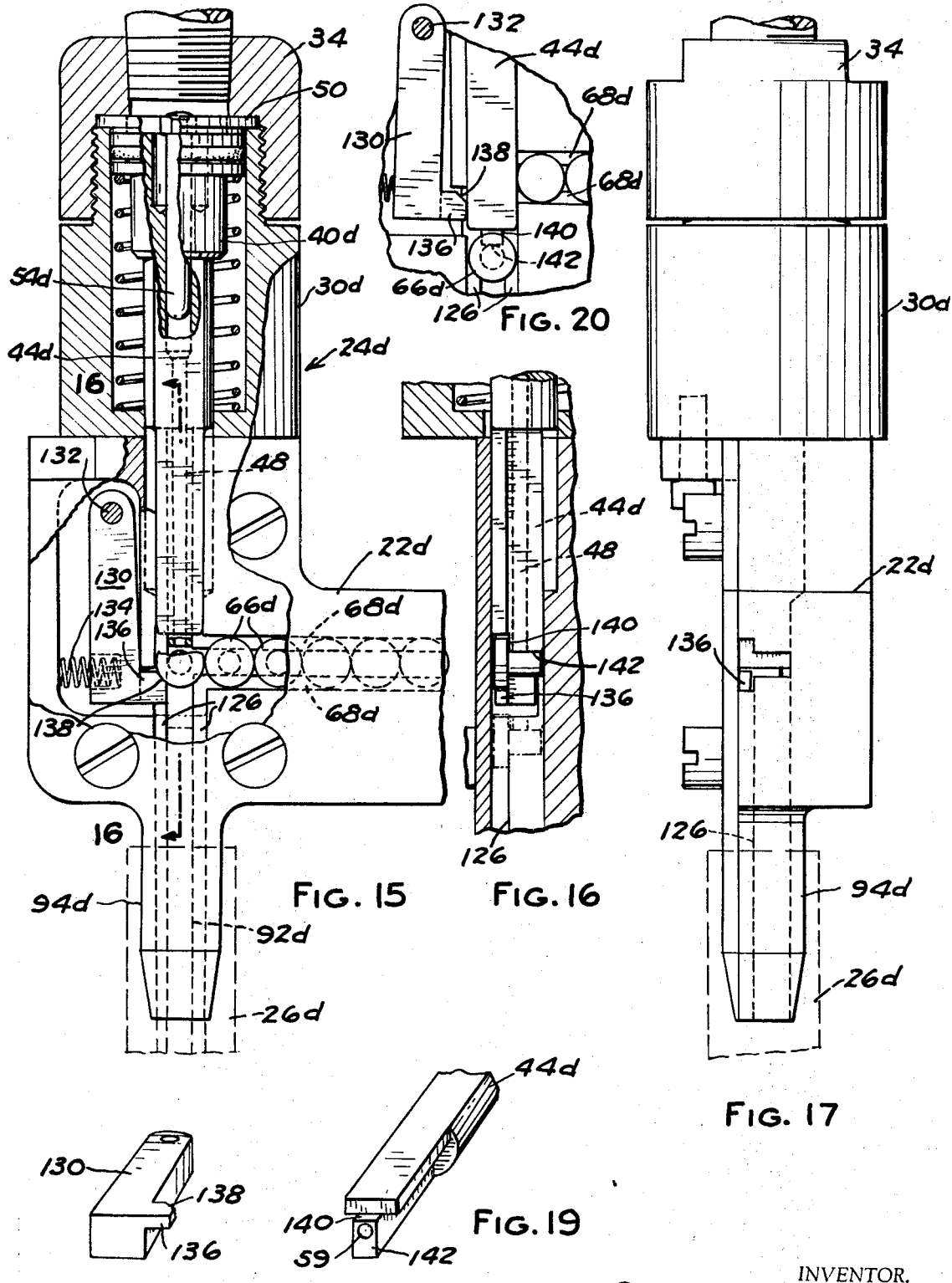

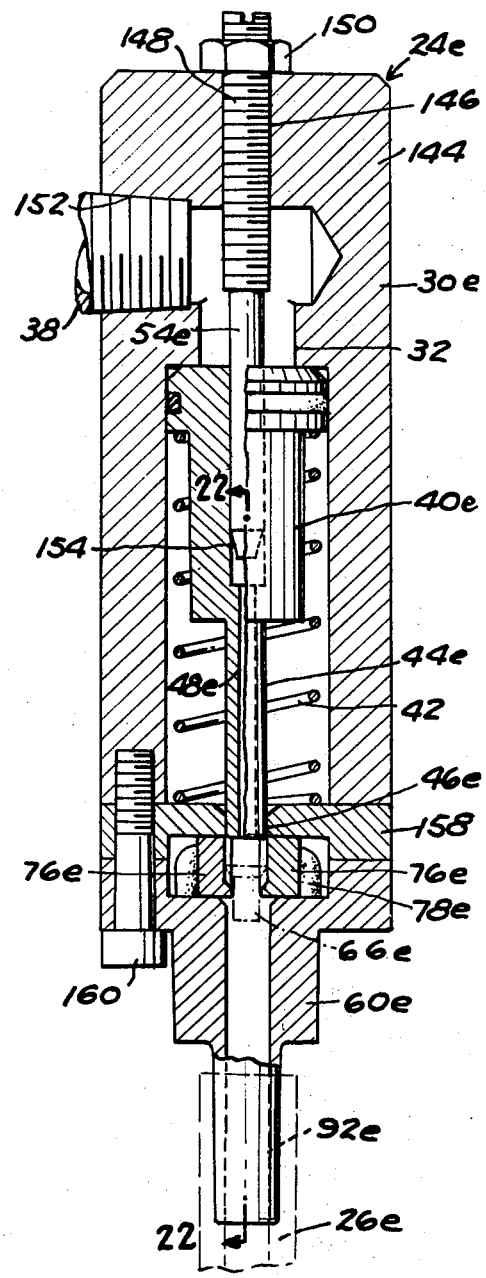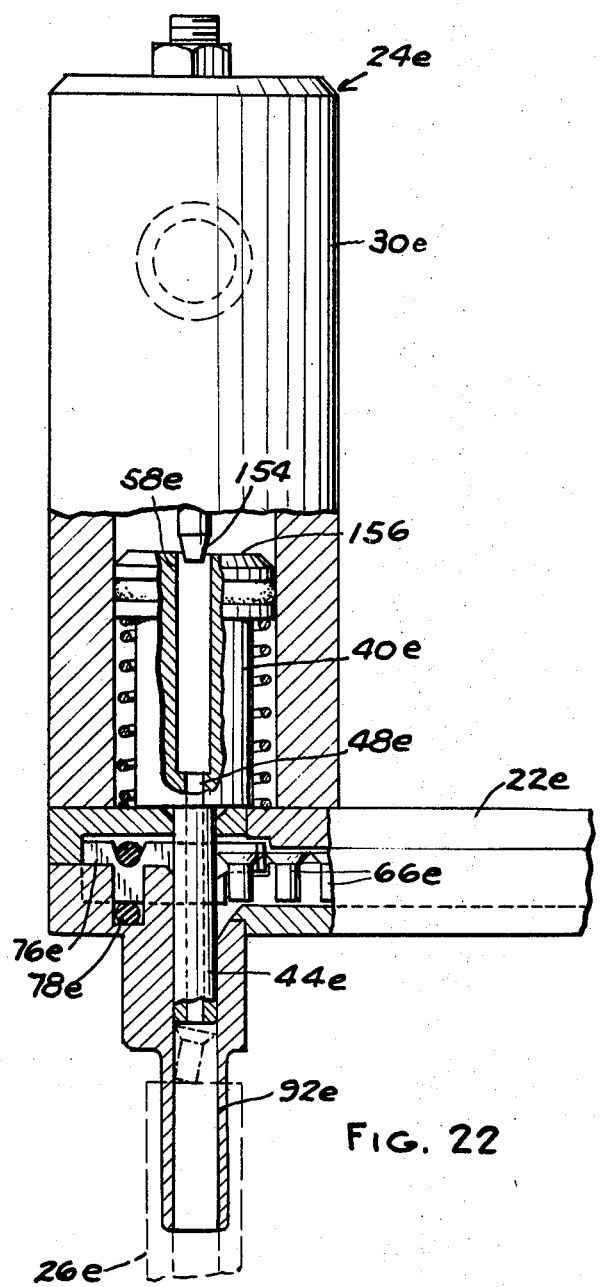
Fig. 21
Fig. 22
INVENTOR.
GARY D. GINTHER
BY
Barnes, Kisselle, Raisch & Choate
ATTORNEYS United States Patent Office 3,517,856
Patented June 30, 1970

3,517,856
APPARATUS FOR FEEDING ARTICLES ONE AT
A TIME INTO A TUBE
Gary D. Ginther, Leonard, Mich., assignor to The Clyde
Corporation, Troy, Mich., a corporation of Michigan
Filed July 11, 1968, Ser. No. 744,022
Int. Cl. B65g 59/00; B65h 3/08
U.S. Cl. 221—278                                    31 Claims

ABSTRACT OF THE DISCLOSURE

Jaws or a detent are spring biased to a position for receiving articles one at a time from a succession of articles in a track and for holding the received article in alignment with a tube. A probe is advanced by an air motor to force the jaws or detent aside for releasing the article into the tube. The probe has a passageway through which compressed air from the air motor passes into the tube behind the article to propel the article through the tube.

This invention relates to an apparatus for feeding articles one at a time from a succession of articles in a track into a tube and propelling the articles through the tube by compressed air. Conventional devices of this type have been incapable of feeding tiny or small odd-shaped parts reliably on a continuous high speed basis. Therefore, such devices have not been satisfactory for use in feeding such parts in automated production machines or systems.

The object of this invention is to provide a feeding apparatus of the type described which is relatively simple and inexpensive and which is improved to feed such parts continuously at a high cyclic rate over long periods of time without malfunction.

Generally, the invention contemplates the use of jaws or a detent positioned for receiving the articles one at a time from the downstream end of the track and holding the received article in alignment with the end of a tube. A probe aligned with the jaws or detent is advanced by a compressed air motor. Upon advancement of the probe, the jaws or detent are thrust aside to release the article for movement into the tube. Upon continued advancement of the probe, a valve introduces air under pressure from the motor through a passageway in the probe and this air is introduced into the tube to propel the article therethrough. The jaws and probe cooperate as an escapement and the jaws also have cam surfaces which positively urge the received article to its proper position in alignment with the probe.

In the accompanying drawings:

FIG. 15 is a view similar to FIG. 3 but showing another modified form of the invention.

FIG. 16 is a fragmentary sectional view on line 16—16 of FIG. 15.

FIG. 17 is a generally side elevational view of the structure shown in FIG. 15.

FIG. 18 is a perspective view of a jaw separate from the other parts.

FIG. 19 is a fragmentary perspective view of a probe in the FIG. 15 form of the invention.

FIG. 20 is a fragmentary view similar to FIG. 15 but showing certain parts in a different position.

FIG. 21 is a view similar to FIG. 2 but showing another modified form of the invention.

FIG. 22 is a view partly in section on line 22—22 of FIG. 21.

Figure 1:
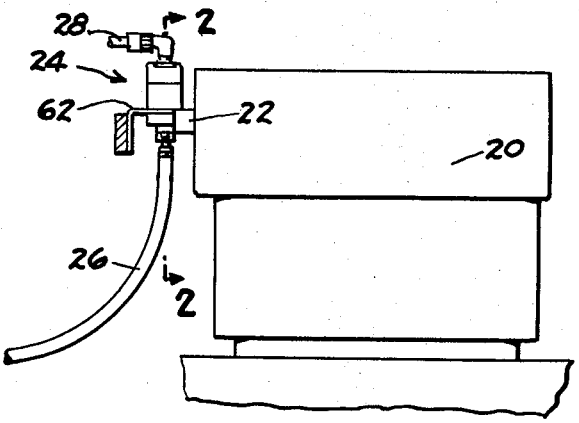
FIG. 1 is a diagrammatic elevational view illustrating an apparatus of the present invention mounted on a hopper.
Figure 2:
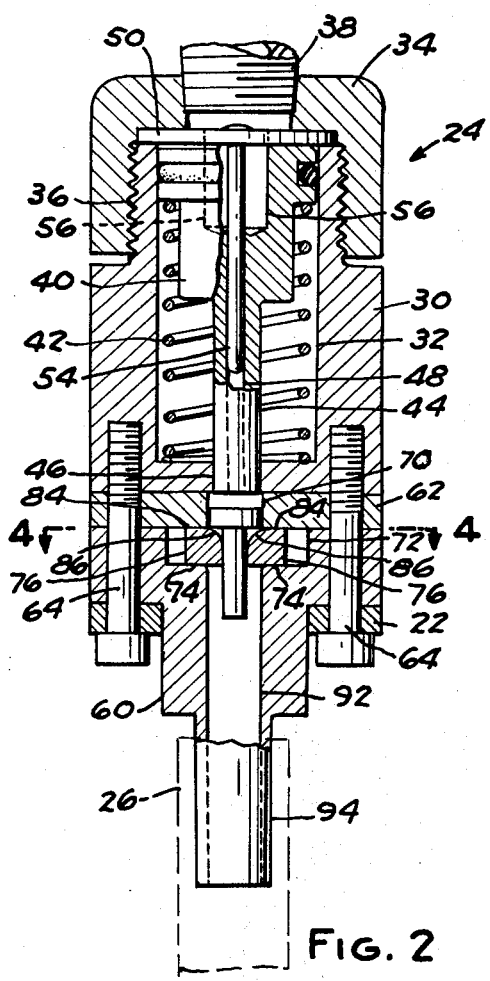
FIG. 2 is an enlarged sectional view on line 2—2 of FIG. 1.

Shown in FIG. 1 is a hopper 20 illustrated as being of a conventional vibratory type from which parts are introduced into a track 22 in a similarly oriented side-by-side train. The track forms a part of a feeder apparatus 24 according to the present invention by which the parts are introduced one at a time from the track into a tube 26. The feeder introduces air from an air line 28 into the tube behind each part to propel the part through the tube.

Feeder 24 has a body 30 which defines an internal cylinder 32 closed at one end by a cap 34 threaded thereto at 36. The cap is provided with a nipple 38 through which air from air line 28 is introduced into the cylinder. Within the cylinder is a piston 40 which is forced downwardly as the drawings are viewed when air is introduced into the cylinder and which is returned upwardly by a compressed coil spring 42 when air under pressure in the cylinder is relieved. Piston 40 has an extension 44 forming a probe which extends slideably through an opening 46 in the bottom of cylinder 32. A passageway 48 extends longitudinally through probe 44 and portions of piston 40 as shown.

A plate 50 is contained between cap 34 and cylinder body 30. This plate is illustrated as being in circular disc form and it is provided with openings 52 which pass air from nipple 38 into the cylinder interior. A valve stem 54 depends from plate 50 and projects slideably into passageway 48. Piston 40 is provided with two openings or bores 56 which parallel passageway 48 and laterally intersect the same. When piston 40 is in a downward position such as that illustrated in FIG. 3, the lower end portions of bores 56 clear the lower end portion of valve stem 54 to define an inlet opening 58 through which air under pressure passes from cylinder 32 into passageway 48. Passageway 48 has an outlet 59 at its lower end as the drawings are viewed. Track 22, an outlet fitting 60 and a supporting bracket 62 are assembled to cylinder body 30 by bolts 64.

The feeder illustrated in FIGS. 1-5 is adapted for use with parts 66 such as screws or rivets each of which has a head with a shank projecting therefrom. Track 22 is provided with spaced apart rails 68 which support the heads of the articles, their shanks passing between these rails. Bracket 62 has an opening 70 aligned with rails 68 through which the lead article in track 22 passes into alignment with probe 44. Outlet fitting 60 has a recess 72 defining a pair of shoulders 74 which support a pair of jaws 76. The jaws are spring urged toward closed condition and in the form of the invention illustrated in FIGS. 1–5, the spring comprises a tensioned ring 78 of elastomeric material such as rubber which passes around the jaws and urges them against an interposed lug 80 on fitting 60. Ring 78 thereby also secures the jaws in their proper location. Lug 80 is recessed at 82 to receive ring 78.

The top portions 84 of jaws 76 are vertically aligned with rails 68 and are provided with cam surfaces 86 which support the head of an article 66 in alignment with probe 44. The jaws are also provided with opposed fingers 88 disposed below rails 68 for engagement with the stem of the lead article 66 in track 22 when the jaws are in closed condition. Fingers 88 have inwardly facing cam surfaces 90 whose purpose is described below. Outlet fitting 60 has an outlet passageway 92 aligned with probe 44 and jaws 76. This passageway extends through a nipple 94 on the outlet fitting adapted to be connected to tube 26.

In use, it may be assumed that feeder 24 has been assembled on hopper 20 and that a mass of articles 66 have been placed in the hopper. When the hopper is in operation, it introduces a series of articles 66 into track 22 in side-by-side relation as shown. An article 66 is supported on jaws 76 which are in closed condition. Fingers 88 thereon engage the shank of the lead article in the track and prevent its moving into the path of movement of probe 44.

When the article supported on jaws 76 is to be delivered through tube 26, suitable conventional controls are actuated to introduce air into air line 28. The air passes through nipple 38 and plate openings 52 into cylinder 32. This forces piston 40 and probe 44 downwardly as the drawings are viewed. The lower end of the probe engages the head of the article supported by jaws 76 and forces the article downwardly. The head of the article by engagement with cam surfaces 86 forces the jaws from the closed condition of FIG. 4 to the spread or open position of FIG. 5 thereby releasing the article so that it passes through outlet tube 92 into tube 26.

Figure 5:
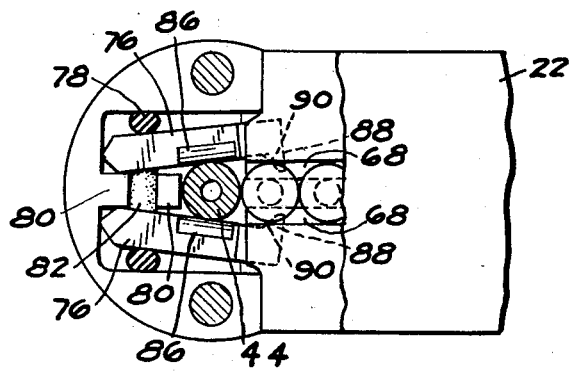
FIG. 5 is a view similar to FIG. 4 but showing the parts in a different position.
Figure 6:
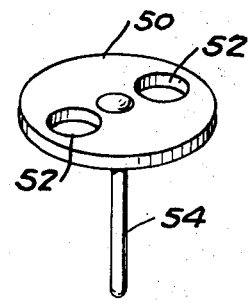
FIG. 6 is a perspective view of a valve stem and supporting plate separate from the other parts.

The probe follows the article downwardly through jaws 76 and when piston 40 has reached the position illustrated in FIG. 5, the lower ends of bores 56 therein clear the lower end of valve stem 54 thereby opening inlet 58. Air under pressure passes from cylinder 32 through passageway 48 and into outlet 92 and tube 26. This air propels the released article through tube 26 to the delivery point.

Figure 3:
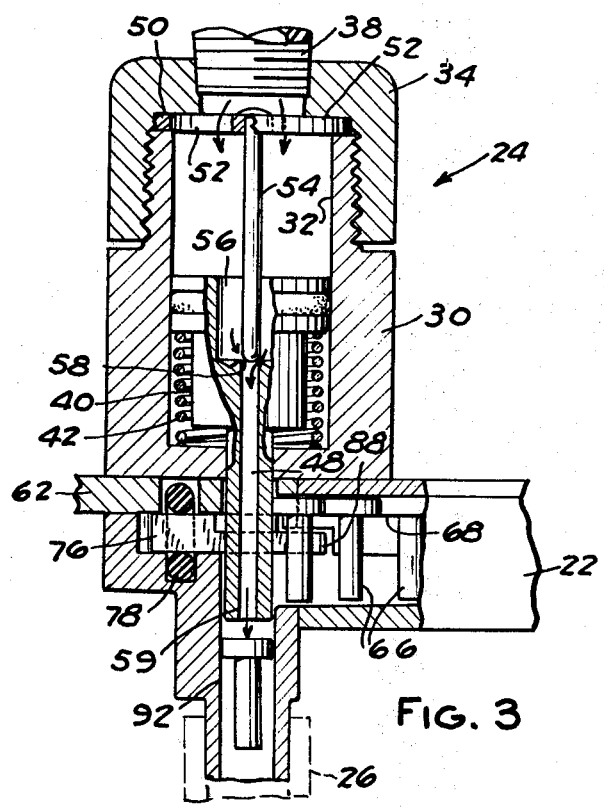
FIG. 3 is a sectional view of the structure shown in FIG. 2 but taken in a vertical line 90° from line 2—2 of FIG. 1.
Figure 4:
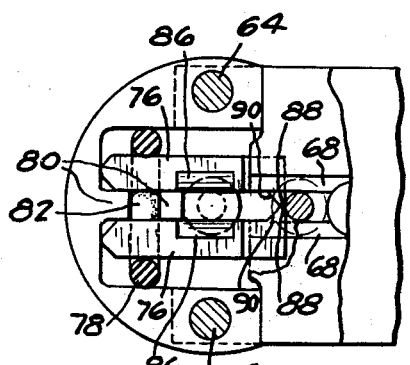
FIG. 4 is a sectional view on line 4—4 of FIG. 2.

When the probe spreads the jaws, the train of articles in track 22 shifts to the left as FIGS. 3–5 are viewed until the head of the lead article engages the probe (FIG. 5). At this time, cam surfaces 90 on fingers 88 are positioned adjacent the stem of the lead article.

When the first article has been delivered from tube 26, the controls are actuated to relieve air under pressure from cylinder 32. Spring 42 returns piston 40 and probe 44 upwardly. When the probe moves upwardly clear of jaws 76, the jaws are closed by spring 78. In this closing movement, cam surfaces 90 on jaws 88 engage the stem of the lead article in the track and force the article to the position of FIGS. 2 and 4 wherein it is supported on the upper surfaces 84 of jaws 76 in alignment with probe 44. At the same time, when fingers 88 close, they obstruct movement of the succeeding article toward the path of movement of probe 44.

From the mode of operation described, it will be seen that in addition to their other functions, probe 44 and jaws 76 cooperate to provide an escapement by which the articles in track 22 are admitted one at a time from the track to their delivery position in alignment with outlet tube 92.

During its movement, piston 40 is guided by engagement of valve stem 50 in the upper portions of passageway 48 to insure proper alignment of the piston and valve stem so that the valve stem enters and closes inlet opening 58 of passageway 48.

To deliver a second article through tube 26, the cycle of operation described above is repeated.

Figure 8:
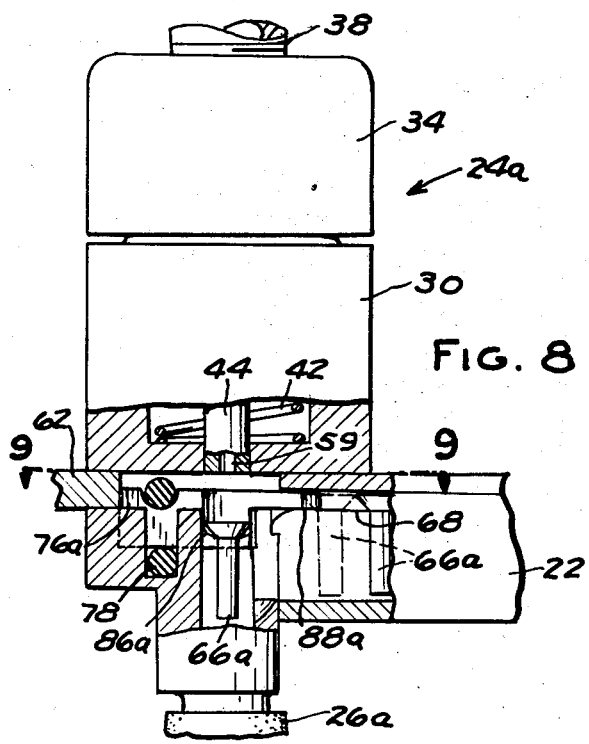
FIG. 8 is a generally elevational view partly in section illustrating a modified form of the invention.
Figure 7:
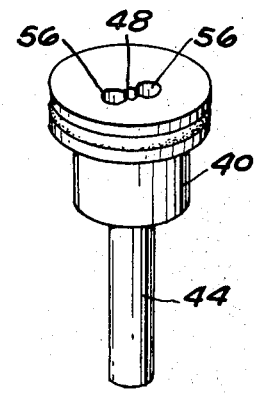
FIG. 7 is a perspective view of a piston and probe assembly.
Figure 9:
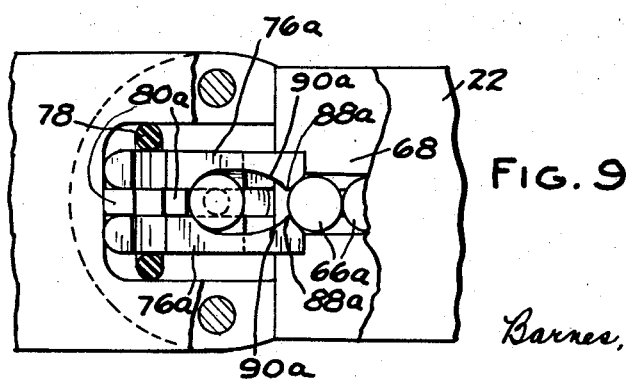
FIG. 9 is a sectional view on line 9—9 of FIG. 8.

The form of the invention shown in FIGS. 8 and 9 is similar to that described above except that fingers 88a and cam surfaces 90a on jaws 76a are positioned for engagement with the head of the lead article 66a in track 22 rather than the shank of the article. The cam surfaces 86a which support an article in alignment with probe 44 are positioned below rails 68 and fingers 88a. Functioning of this form of the invention is similar to that described above except that an article 66a moves downwardly as the drawings are viewed in passing from track 22 into its delivery position on jaws 76a.

Figure 10:
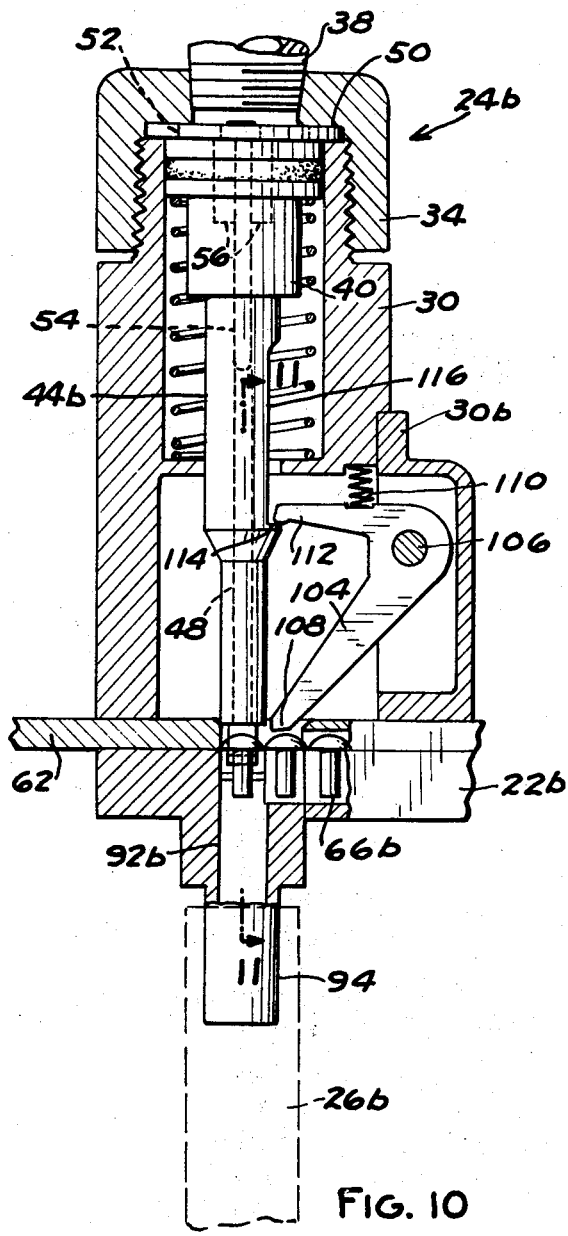
FIG. 10 is a view similar to FIG. 3 showing a modified form of the invention.
Figure 11:
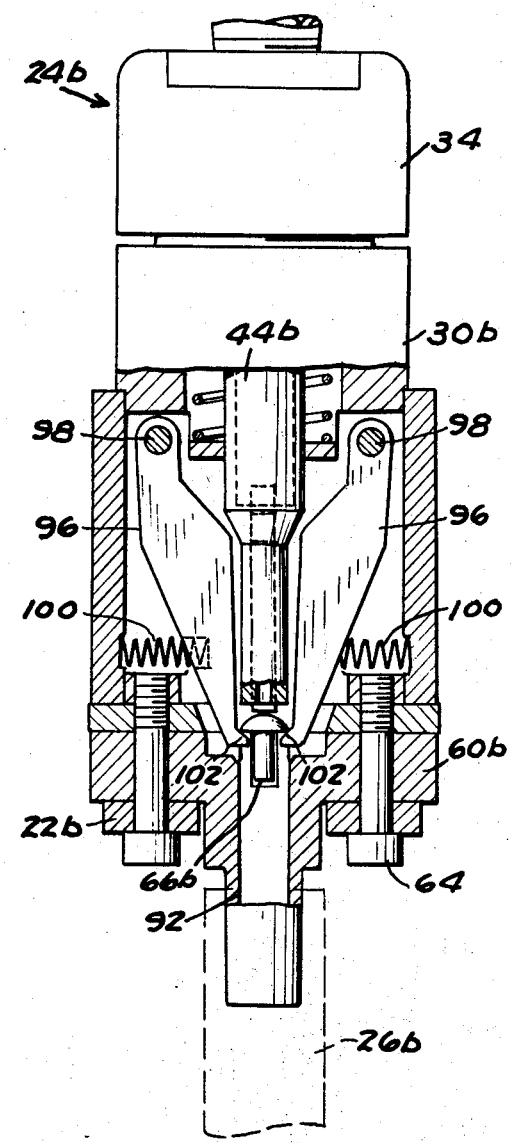
FIG. 11 is a sectional view on line 11—11 of FIG. 10.

The feeder 24b shown in FIGS. 10 and 11 is in general similar to the forms described above except that jaws 96 are pivoted onto body 30b at 98 and are biased inwardly by compressed coil springs 100. The jaws have cam surfaces 102 which support an article 66b in a position for release into outlet tube 92. The sides of the jaws facing track 22b are open for receiving the lead article from the track.

A stop lever 104 is pivoted onto body 30b at 106. Lever 104 has a finger 108 which is positioned closely adjacent the lead article in the track. A compressed coil spring 110 urges the lever in a counterclockwise direction as FIG. 10 is viewed. The stop has another finger 112 which is engaged by a shoulder 114 on probe 44b when the probe is in its upward retracted position of FIG. 10. Lever 104 is thereby restrained against rocking downwardly under the action of spring 110 and finger 108 is held out of engagement from the lead article in track 22b. The probe is provided with a longitudinal recess 116 above shoulder 114.

When compressed air is introduced into cylinder 32, probe 44b is moved downwardly and the force thereof on article 66b cams surfaces 102 aside to open jaws 96 and release the article into outlet tube 92. The probe projects through the jaws and introduces air into the tube behind the article to propel it through tube 26.

Upon downward movement of the probe, the support of shoulder 114 is removed from finger 112 and spring 110 rocks lever finger 108 downwardly against the lead article in track 22b. This provides a positive stop against movement of the lead article toward the path of movement of the probe. When the probe retracts upwardly, shoulder 114 re-engages finger 112 and lifts finger 108 off of the lead article in the track permitting it to enter jaws 96.

Figure 12:
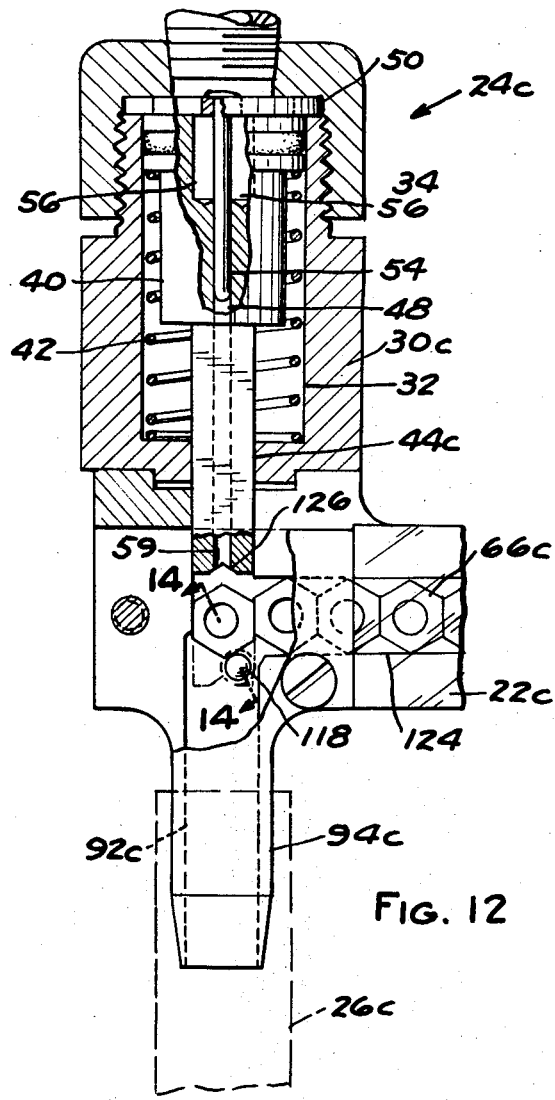
FIG. 12 is a view similar to FIG. 3 illustrating another modified form of the invention.
Figure 13:
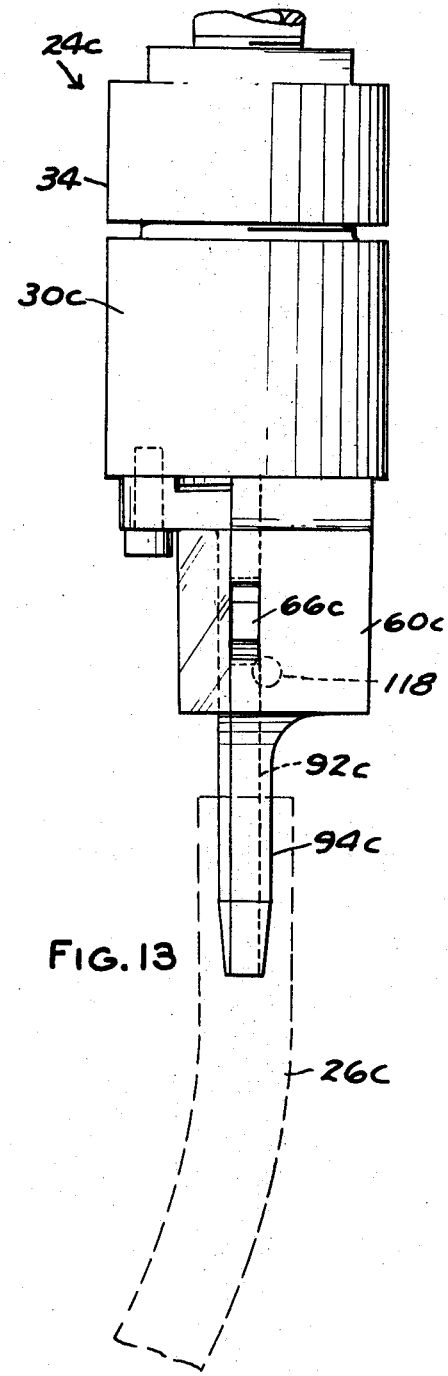
FIG. 13 is a side elevational view of the structure shown in FIG. 12.
Figure 14:
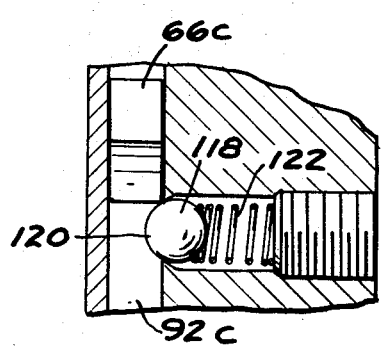
FIG. 14 is an enlarged sectional view on line 14—14 of FIG. 12.

The form of feeder 24c shown in FIGS. 12–14 is in general similar to those described above except that it is adapted for use with articles 66c which are essentially flat or disc shaped such as nuts, washers, clips and like. Instead of jaws, feeder 24c utilizes a detent ball 118 having a portion 120 projected by a spring 122 into the path of movement of probe 44c. As shown in FIG. 12, the top of ball portion 120 is aligned with the bottom surface 124 of track 22c. Probe 44c is rectangular and has an end notch 126 for engaging a side of a nut 66c. The interior of outlet tube 92c is rectangular as is the interior of tube 26c to contain an article passing therethrough in its proper orientation.

When probe 44c advances downwardly, the force thereof on article 66c forces ball 118 aside against the action of spring 122 thereby releasing the article for entry into outlet tube 92c. Air is introduced through passageway 48 into the tube behind the article for propelling it through tube 26 as in the previously described forms. When the probe retracts upwardly, the succeeding article in track 22c enters into alignment with the probe from track 22c and is there supported by ball portion 120 until the probe again advances.

The form of feeder 24d shown in FIGS. 15–20 is in general similar to the previously described forms except that it is adapted for use with articles 66d such as screws having a head diameter which is so large in relation to its length that the screw would tumble in a tube having an internal passageway of circular cross section. To prevent articles 66d from tumbling and to maintain the articles in their proper orientation, outlet passageway 92d is configured generally complementally to the exterior configuration of the article and the interior passageway of tube 26d is similarly configured. By way of illustration, outlet passageway 92d has spaced apart rails 126 which support the head of a screw 66d, the shank of the screw projecting between the rails. Inlet track 22d is provided with similar spaced apart rails 68d for the same purpose.

Feeder 24d has a singe jaw 130 pivoted to body 30d ah 132 and biased inwardly by a coil spring 134. Jaw 30 has a finger 136 provided with a cam surface 138 which in inward position of the jaw is positioned to receive and support an article 66d received from track 22d in alignment with probe 44d. Probe 44d has a notched forward end which defines a shoulder 140 and a contiguous forward end face 142. When probe 44d is in the retracted position of FIGS. 15, 16, shoulder 140 thereon is aligned with rails 68d (as the drawings are viewed) of inlet track 22d for supporting the head of an article 66d received from the track. Shoulder 140 may be regarded as an extension of rails 68d. In the retracted position of probe 44d the article in alignment therewith is contained against entry into outlet passageway 92d by finger 136.

When probe 44d advances downwardly, the force thereof on article 66d forces cam 138 and jaw 130 aside against the action of spring 134 thereby releasing the article for entry into outlet tube or passageway 92d. In this particular instance the advancing force of the probe is transmitted to screw 66d by engagement of end face 142 of the probe against the shank of the screw. Air is introduced through passageway 48 into the tube behind the article for propelling it through tube 26d as in the previously described forms. When the probe retracts upwardly, the succeeding article in track 22d enters into alignment with the probe from track 22d and is there supported by shoulder 140 and finger 136 until the probe again advances.

The form of feeder 24e shown in FIGS. 21, 22 is in general similar to those described above except that body 30e has an integral cap or end portion 144 provided with a threaded opening 146 which is coaxial with cylinder 32. A screw 148 is threaded into this opening and valve stem 54e comprises an extension of this screw. A nut 150 is threaded onto a portion of screw 148 which projects outwardly of body 30e as shown. The body has a compressed air inlet 152 through which air is introduced into cylinder 32.

Piston 40e and probe 44e are provided with a longitudinal passageway 48e as in the previously described forms of the feeder but passageways 56 are omitted from piston 40e. Valve stem 54e has a tapered lower end portion 154 which is radially cleared by the upper end 156 of the piston in the advanced or downward position thereof to define the air inlet opening 58e into passageway 48e.

The lower end of cylinder 32 is closed by a plate 158 secured to body 30e and by bolting 160. This plate has an opening 46e through which probe 44e slidably projects.

Feeder 24e may be provided with any of the jaw structures or ball detent previously described depending upon the nature of the article 66e with which the feeder is adapted to be used. Feeder 24e is illustrated as utilizing jaws 76e and an outlet fitting 60e generally similar to the corresponding parts of feeder 24a shown in FIGS. 8 and 9.

Feeder 24e functions in a manner generally similar to the feeders described above. However, in this form of the invention, the amount of air admitted into passageway 48e for propelling an article 66e through tube 26e may be adjustably regulated. This is done by loosening nut 150 and turning screw 148 to advance or retract valve stem 54e to reduce or enlarge the size of air inlet 58e from cylinder 32 into passageway 48e. Once the proper adjustment has been obtained nut 150 is tightened against the top of body 30e to lock screw 148 and valve stem 154e in properly adjusted position.

This form of the invention has another advantage in that closure plates 158 having openings 46e therein of various sizes and configurations may be used selectively to accommodate probes 48e of different sizes and configurations. The adjustability of valve stem 54e and the interchangeability of closure plates 158 facilitates standardization of feeder bodies 30e.

By way of example, feeders according to the present invention have been successfully used commercially to feed very small articles such as No. 0 pan head screws which have head diameter of .105 inch, a shank diameter of .060 inch and a length of .110 inch. As a further example of a successful commercial use, feeders 24d (FIGS. 15-20) have been used to feed No. 2 binding head screws having a shank diameter of .085 inch, a shank length of .110 inch, a head diameter of .175 inch, and an overall length of only .165 inch. Feeders according to the invention have also been used with commercial success in feeding small pins, U-shaped clips and other small, lightweight, odd-shaped items. The feeders operate through many thousands of cycles at a cyclic rate of about 100 per minute without failure or malfunction. It is thus satisfactory for use in automatic production machinery and systems.

A typical feeder according to this invention is considerably smaller than shown in the drawings. It is relatively inexpensive and has a mass so small that it can, for example, be mounted directly on a vibratory type hopper without significantly damping the essential vibratory movement thereof.

While the apparatus is particularly useful in feeding very small and sometimes odd-shaped items, it is also useful in feeding large and more easily handled articles.

What is claimed is:

1. In an apparatus wherein articles are transferred one at a time from a track to releasable support means aligned with a tube and then into the tube upon release of the support means, improved structure which comprises,
   means forming a probe mounted for advancement toward and retraction away from said support means,
   air-actuated motor means operably connected with said probe,
   said probe being operable to release said support means responsive to advancement thereof toward said support means,
   said probe having a passageway with an outlet positioned in released condition of said support means to introduce air under pressure into said tube,
   and means including a valve operable to introduce air under pressure from said motor means into said passageway responsive to advancement of said probe to released condition of said support means.

2. The apparatus defined in claim 1 wherein said motore means comprises a cylinder with a piston therein, said probe being connected for movement with said piston.

3. The apparatus defined in claim 2 wherein said passageway extends longitudinally through said probe and at least a portion of said piston.

4. The apparatus defined in claim 3 wherein said passageway has an inlet defined by a portion of said piston, said valve comprising a stem in said cylinder which projects into said passageway to close said inlet in retracted position of said probe and which clears said inlet in advanced position thereof to open said passageway to the cylinder interior.

5. The apparatus defined in claim 4 wherein said piston has a guide opening aligned with said passageway within which said stem fits and is guided toward said inlet upon retraction of said piston.

6. The apparatus defined in claim 5 wherein said piston has a bore which opens at one end to said cylinder and which opens at the other end into said passageway to provide said inlet.

7. The apparatus defined in claim 6 wherein said bore parallels and laterally intersects said guide opening.

8. The apparatus defined in claim 5 wherein said cylinder comprises a body and a cap thereon, an element being supportingly contained between said body and cap, said stem being mounted on said element.

9. The apparatus defined in claim 8 wherein said element comprises a circular disc, said cap having an air inlet opening adjacent the side of said disc opposite from the cylinder, said disc being apertured to pass air from said cap opening into said cylinder.

10. The apparatus defined in claim 1 wherein said support means comprises a pair of jaws resiliently biased toward closed condition,
said jaws being spreadable to release a supported article responsive to advancement of said probe,
said jaws having end portions which in spread condition receive a subsequent article in said track,
said end portions being provided with opposed cam surfaces effective to urge a received article toward alignment with the tube responsive to closing movement of said jaws upon retraction of said probe.

11. The apparatus defined in claim 10 wherein said track has spaced apart rails adapted to support the head of an article and to straddle a shank of the article projecting from the head, said jaws having spaced apart portions positioned to supportingly engage the head of an article received from the track with the shank thereof disposed between said jaw portions.

12. The apparatus defined in claim 11 wherein said spaced apart jaw portions are aligned with said rails and said cam surfaces are positioned to engage the shank of the subsequent article in said track.

13. The apparatus defined in claim 12 wherein said cam surfaces are displaced from said rails toward asid tube.

14. The apparatus defined in claim 13 wherein said cam surfaces are below said rails.

15. The apparatus defined in claim 11 wherein said cam surfaces are positioned to engage the head of the subsequent article, said spaced apart jaw portions being displaced from said rails toward said tube.

16. The apparatus defined in claim 15 wherein said spaced apart jaw portions are below said rails.

17. The apparatus defined in claim 11 wherein said end portions of said jaws have end surfaces which cooperate in closed condition to provide an obstruction to movement of a succeeding article in said track toward said support means.

18. The apparatus defined in claim 1 and including in addition means forming a movable stop resiliently biased into engagement with an article in said track adjacent said support means to obstruct movement thereof toward said support means in advanced position of said probe, said probe having means effective to move said stop out of engagement with the article responsive to retraction thereof.

19. The apparatus defined in claim 18 wherein said support means comprises jaws resiliently biased to closed condition and having open portions positioned to receive an article disengaged by said stop, said jaws being spreadable to release the article responsive to advancement of said probe.

20. The apparatus defined in claim 1 wherein said support means comprises a pair of jaws having a relatively closed condition in which they support an article and being spreadable for releasing an article responsive to advancement of said probe,
said jaws having opposed portions which in closed condition of said jaws are engaged against opposite sides of an interposed lug, spring means urging said jaws against said lug and thereby holding said jaws in their proper position and urging said jaws toward closed condition.

21. The apparatus defined in claim 20 wherein portions of said lug are engaged by end portions of said jaws and provide fulcrums for swinging of said jaws to spread condition against the spring bias.

22. The apparatus defined in claim 21 whrein said spring means comprises a tensioned resilient ring surrounding portions of said jaws, said lug being recessed to receive said ring.

23. The apparatus defined in claim 1 wherein said support means comprises a detent urged to a position in which it substantially freely passes an article from said track to alignment with the tube but forms an obstruction to movement of the article toward said tube, said detent being retractable to release the article responsive to force exerted on the article by said probe upon advancement thereof.

24. The apparatus defined in claim 23 wherein said track is adapted to carry essentially disc shaped articles, said detent comprising an element having a spherical portion spring projected into the path of the article toward said tube.

25. The apparatus defined in claim 23 wherein said detent comprises a single jaw spring biased so that a portion thereof is projected into the path of the article toward said tube when said probe is in retracted position, said jaw being swingable to one side to so release the article responsive to force exerted on said portion thereof by the article upon advancement of said probe.

26. The apparatus defined in claim 23 wherein said track has spaced apart rails adapted to support the head of an article and to straddle a shank of the article projecting from the head, said probe having an end portion which defines a shoulder which is aligned with one of said rails in retracted position thereof, said shoulder and detent being cooperable to support an article received from said track.

27. The apparatus defined in claim 26 wherein said probe has an end surface adjacent said shoulder and positioned to engage the shank of an article supported thereby, said end surface by engagement with said shank being effective to exert said force on said article.

28. The apparatus defined in claim 4 wherein said inlet is defined by an end portion of said piston.

29. The apparatus defined in claim 4 wherein said piston portion and a portion of said stem are cooperable to vary the size of said inlet responsive to variations in the relative axial positions thereof in said advanced position of said probe, and means operable to adjust said relative position.

30. The apparatus defined in claim 29 wherein said valve stem comprises an axial extension of a screw, said screw comprising said means operable to adjust said relative position.

31. The apparatus defined in claim 30 wherein said inlet is defined by an end portion of said piston, said stem portion being tapered and projecting within said end portion.

References Cited

UNITED STATES PATENTS

| | | | |
|---|---|---|---|
| 2,657,721 | 11/1953 | Shaff | 221—258 X |
| 3,091,363 | 5/1963 | Klancnik. | |
| 3,130,638 | 4/1964 | Horton, et al. | 221—278 X |
| 3,275,191 | 9/1966 | MacDonald | 221—175 |

ROBERT B. REEVES, Primary Examiner

D. A. SCHERBEL, Assistant Examiner

U.S. Cl. XR

221—225, 236